(12) United States Patent
Sagalovitch et al.

(10) Patent No.: US 10,866,917 B2
(45) Date of Patent: Dec. 15, 2020

(54) INTER DEVICE DATA EXCHANGE VIA EXTERNAL BUS BY UTILIZING COMMUNICATION PORT

(71) Applicant: ATI TECHNOLOGIES ULC, Markham (CA)

(72) Inventors: Serguei Sagalovitch, Markham (CA); Ilya Panfilov, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/208,369

(22) Filed: Dec. 3, 2018

(65) Prior Publication Data

US 2020/0174957 A1 Jun. 4, 2020

(51) Int. Cl.
*G06F 13/40* (2006.01)
*G06F 13/20* (2006.01)
*G06F 12/02* (2006.01)

(52) U.S. Cl.
CPC ........ *G06F 13/404* (2013.01); *G06F 12/0246* (2013.01); *G06F 13/20* (2013.01); *G06F 2213/0026* (2013.01); *G06F 2213/16* (2013.01)

(58) Field of Classification Search
None
See application file for complete search history.

(56) References Cited

U.S. PATENT DOCUMENTS

| | | | | |
|---|---|---|---|---|
| 6,304,553 B1* | 10/2001 | Gehman | ........... | H04L 12/40071 370/235 |
| 7,039,116 B1* | 5/2006 | Zhang | ................. | H04N 21/2402 348/441 |
| 7,526,593 B2* | 4/2009 | Mandal | ................. | G06F 13/404 710/310 |
| 8,300,641 B1* | 10/2012 | Vincent | ............... | H04L 61/1505 370/392 |
| 8,463,881 B1* | 6/2013 | Baker | ..................... | H04L 29/06 709/220 |
| 8,516,165 B2* | 8/2013 | Tsu | ..................... | G06F 13/4022 710/30 |
| 9,172,775 B2* | 10/2015 | Hu | ......................... | H04L 69/22 |
| 9,317,466 B2* | 4/2016 | Debendra | ............... | H04L 47/41 |
| 2004/0001508 A1* | 1/2004 | Zheng | ..................... | H04L 69/04 370/466 |

(Continued)

*Primary Examiner* — Michael Sun (57) ABSTRACT

The present disclosure relates to techniques for facilitating communication and memory transfer between PCIe devices that permit access to an entire address space even though a limited address space is exposed and/or visible via the PCIe BAR registers. To this end, the present disclosure aims to permit memory transfer of large blocks of memory from one device to another including memory invisible to the system (i.e. not exposed via PCIe BAR registers). For example, in some embodiments, a data packet may be received at a port associated with a processor interconnect. The data packet includes a header which contains a first address associated with the port. In response to identifying the first address from the first data packet at the port, the data packet is decoded. During the decoding process, a second address is identified in a payload of the data packet. The second address corresponds to a first memory location, and data associated with the payload of the data packet is then stored to the first memory location.

20 Claims, 4 Drawing Sheets

(56) References Cited

U.S. PATENT DOCUMENTS

| | | | |
|---|---|---|---|
| 2013/0170451 A1* | 7/2013 | Krause | H04L 69/14 370/329 |
| 2013/0279380 A1* | 10/2013 | Hong | H04H 20/72 370/310 |
| 2013/0315248 A1* | 11/2013 | Morimoto | H04L 69/22 370/392 |
| 2015/0288787 A1* | 10/2015 | Banavalikar | H04L 45/00 370/392 |
| 2016/0337723 A1* | 11/2016 | Graves | H04Q 11/0005 |
| 2017/0250838 A1* | 8/2017 | Khawer | H04L 12/4633 |

* cited by examiner

INTER DEVICE DATA EXCHANGE VIA EXTERNAL BUS BY UTILIZING COMMUNICATION PORT

BACKGROUND

Description of the Related Art

To enhance processing efficiency, some processing systems employ specially designed hardware modules to assigned with specific types of operations. For example, some processing systems include one or more graphics processing units ("GPUs") to perform operations associated with graphics and vector processing. To support the operations of the different hardware modules, it is sometimes necessary for the processing system to move large blocks of data between different memories or other portions of the processing system. One data transfer method uses standard hardware direct memory access ('DMA") engines on the GPU. Another data transfer method uses direct read and write access. However, these conventional methods of data transfer do not support the efficient transfer of large blocks of data.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Various embodiments of the present disclosure facilitate the transfer of large amounts of data between modules connected to a bus or other interconnect, such as a, Peripheral Component Interconnect Express ("PCIe") bus. For example, on a given computer system there can be many different PCIe devices (e.g., GPUs, storage modules, etc.) connected to the PCIe bus. As a characteristic of data transfer, PCIe devices expose base address registers ("BARs") to the system, to access specific areas of the device memory. Each BAR stores a base address for a memory or other storage location associated with the PCIe device. Other PCIe devices can access the BAR to transfer data to the corresponding storage location. However, the BARs typically allow only a relatively small portion of the memory, and therefore do not support efficient transfer of large blocks of data. To this end, the present disclosure permits large blocks of data to be transferred from one module to another to another (i.e. one GPU to another GPU) by allowing access to memory invisible to the system (i.e. memory not exposed via PCIe BAR registers).

For example, in some embodiments, a memory transfer system includes an encoder module. The encoder module is configured to obtain, via an interconnect, a data packet. The data packet includes a first header having a first address corresponding to a first memory location associated with a device, such as, for example, a PCIe device. The data packet also includes a payload (e.g., the data to be transferred). In response to identifying the first address, the encoder module encodes the data packet. During the encoding process, the first address is embedded into the payload of the data packet and the payload of the data packet is wrapped with a second header. The second header specifies a second address corresponding to a port. The data packet is then transmitted to a memory location associated with the second address. In response to a receipt of the data packet at the port, a decoder module decodes the data packet. During the decoding process, the first address is identified in the payload of the data packet. The data associated with the payload of the data packet is then transmitted and stored to the memory location corresponding to the first address. The data stored in the memory locations associated with each of the PCIe Devices.

Figure 1:
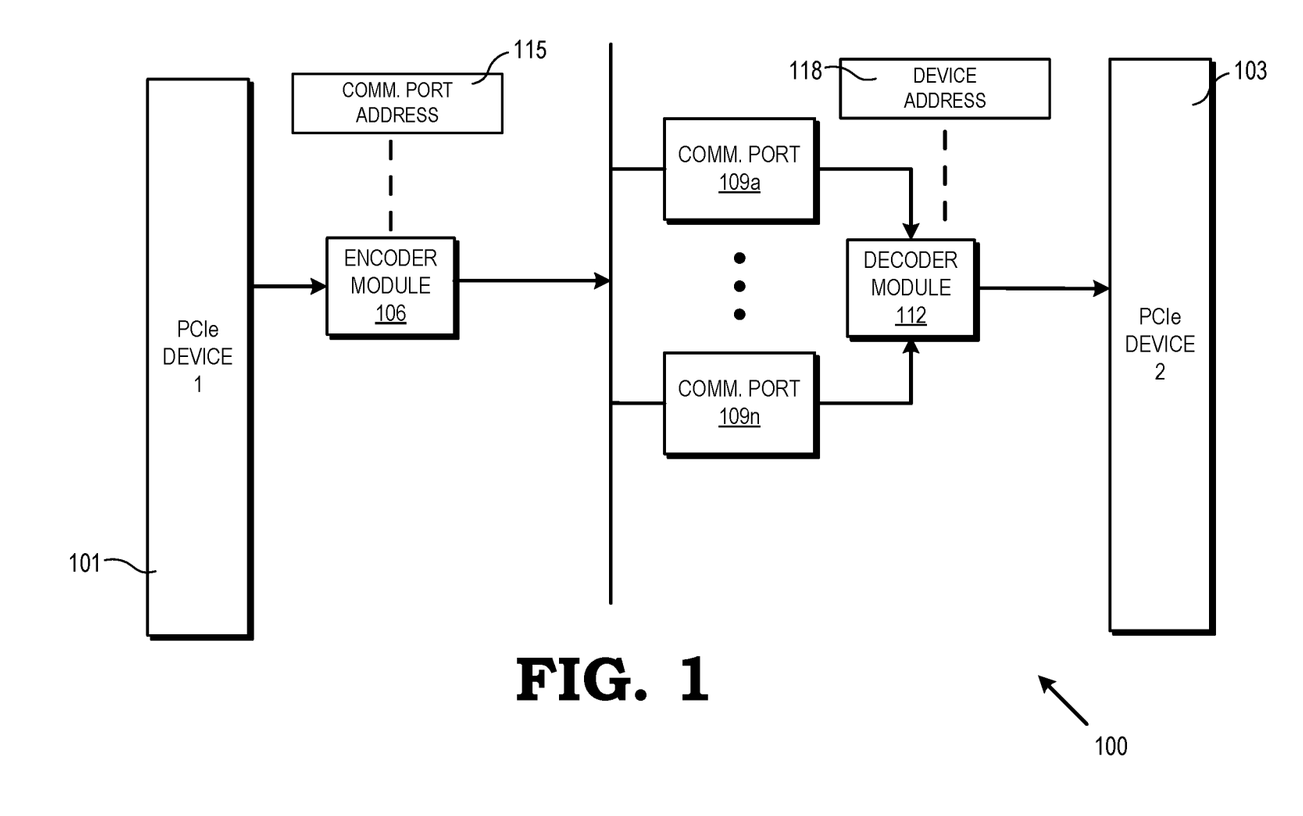
FIG. 1 is a block diagram illustrating a processor having a memory transfer system for facilitating transferring large blocks of data between modules of a processor in accordance with some embodiments.

FIGS. 1-4 illustrate techniques for facilitating the transfer of large blocks of data between modules according to various embodiments. With reference to FIG. 1, FIG. 1 is a block diagram illustrating a processor having a memory transfer system 100 for facilitating transferring large blocks of data between modules in accordance with some embodiments. In different embodiments, the processor is incorporated into one of a variety of electronic devices, such as a desktop or laptop computer, a server, a smartphone, a tablet, a gaming console, and the like. The processor is generally configured to execute sets of instructions (e.g. computer programs) to carry out specified tasks on behalf of the electronic device. During execution of the sets of instructions, the processor is sometimes requested to move data between processor modules. These data transfers are supported by the memory transfer system 100, as described further below.

The memory transfer system 100 includes PCIe Devices 101, 103, an encoder module 106, ports 109*a*-109*n*, and a decoder module 112. The PCIe Devices 101, 103 include, for example, modules such as, for example, GPUs, input/output modules, storage modules and associated controllers, and the like. The port 109*a* is associated with memory address ranges that are visible to the PCIe interface which allows communication of data between the PCIe devices (i.e. GPUs) and the ports themselves. Alternatively, in some embodiments a plurality of ports 109*a*-109*n* are employed. The multiple ports 109*a*-109*n* are associated with an interconnect and are assigned in different combinations for different peer-to-peer scenarios. For example, each of the plurality of ports 109*a*-109*n* may be associated with a different device. For purposes of convenience, the port 109*a* is referred to herein in the singular. Even though port 109*a* is referred to in the singular, it is understood that in some embodiments a plurality of ports 109*a*-109*n* are employed in the various arrangements described above.

Various communication, data transfer and/or other functionality may be implemented by PCIe Devices 101, 103 according to various embodiments. The techniques for facilitating the transfer of large blocks of data may be employed using multiple PCIe Devices 101, 103. Various data may be stored in an address space, such as, for example, a device address 118 corresponding to memory locations associated with each of the PCIe Devices 101, 103.

An address space is the amount of memory allocated for all possible addresses for a computational entity, such as a device, a file, a server, or a networked computer. Additionally, the address space may refer to a range of either physical or virtual addresses accessible to a processor or reserved for a process. For example, a PCIe Device 101, such as, for example, a GPU may generate operations to access data stored at the address space corresponding to a memory location associated with another PCIe Device 103 (i.e. a different GPU). These operations are referred to as "memory accesses." Examples of memory accesses include read accesses to retrieve data from memory and write accesses to store data to memory. Each memory access includes an address space indicating a memory location that stores the data to be accessed. In some embodiments, there are two address spaces used by the memory transfer system, such as, for example, a processor interconnect address space used by the processor interconnect to route data packets to different modules, and a memory address space used to address a memory location.

The modules implemented in the memory transfer system 100 include an encoder module 106 and a decoder module 112 and/or other services, systems, engines, or functionality not discussed in detail herein. The encoder module 106 is configured to receive a data packet from a PCIe Device 101. A data packet is a basic unit of communication over a digital network. When data has to be transmitted, it is broken down into similar structures of data before transmission, called data packets. A data packet has a header and a payload.

In response to obtaining the data packet, the encoder module 106 identifies a device address 118 corresponding to a memory location associated with a PCIe Device 103. In one embodiment, at least a portion of the device address 118 is not visible or exposed via the PCIe base address registers. The encoder module 106 then encodes the data packet. Typically, the header keeps overhead information about the packet, the service, and other transmission-related data. The payload is the "data being transferred" in a data packet minus all headers attached for transport and minus all descriptive meta-data. In a data packet, headers are appended to the payload for transport and then discarded at their destination. However, in some embodiments of the present disclosure, during the encoding process, the device address 118 which is contained in the header of the data packet is embedded into the payload of the data packet instead of being discarded. The payload is then wrapped with a second header. The second header specifies a communication port address 115 corresponding to a port 109a. In some embodiments, the communication port address 115 is visible or exposed via the PCIe base address registers. In some embodiments the device address 118 is associated with an address space that is larger than the address space associated with the communication port address 115. The data packet is then transmitted to a memory location associated with the communication port address 115.

In response to receipt of the data packet at the port 109a, a decoder module 112 decodes the data packet. During the decoding process, the device address 118 is identified in the payload of the data packet. The data associated with the payload of the data packet is then transmitted and stored to the memory location corresponding to the device address 118.

In yet another embodiment, the encoder module 106 is configured to obtain via a processor interconnect a plurality of data packets from a PCIe Device 101. Each of the data packets includes a first header. The first header includes a first address corresponding to a first memory location associated with a PCIe Device 103. Additionally, the first header may include a transaction identifier. The transaction identifier may be used to uniquely identify each request associated with the each one of the plurality of data packets. For example, the transaction identifier may indicate a start of the transaction, a continuation of a transaction, or an end of transaction.

Each of the of data packets also includes a payload. Upon identifying multiple data packets having the same first address, the encoder module 106 may be configured to compress the plurality of data packets into a compressed data packet. In one embodiment, the encoder module 106 may also embed the first address into the payload of the compressed data packet. Additionally, the encoder module 106 may embed data associated with the payloads of each of the data packets into the payload of the compressed data packet.

The encoder module 106 may be further configured to wrap the payload of the compressed data packet with a second header. The second header includes a second address corresponding to the communication port address 118. The encoder module 106 then transmits the compressed data packet to a memory location associated with the port 109a corresponding to the communication port address 118. The port 109a receives the compressed data packet. In response to the compressed data packet being received by the port 109a, the decoder module 112 may be configured to decode the compressed data packet.

During the decoding process, the decoder module 112 identifies the first address. Additionally, the decoder module 112 is configured to identify the data associated with each of the payloads. The decoder module 112 may also be configured to identify the transaction identifiers. The decoder module 112 may then be configured to perform a transaction involving data associated with each of payloads based at least in part upon the transaction identifier. The decoder module 112 then stores an output of the transaction to the first memory location.

In yet another embodiment, a first data packet, a second data packet, and a third are received via processor interconnect by a port 109a. For example, the first data packet, the second data packet and the third data packet may be associated with a transfer of a block of data from one memory location to another memory location. The third data packet comprises a third header including the first address. In response to identifying the first address from the third data packet at the port, the third data packet is decoded by the decoder module 112. The decoder module 112 also identifies a third address in a payload of the third data packet. The third address corresponds to a third memory location different from the first and second memory locations. Additionally, the address space associated with the first address is larger than an address space associated with the third address. The decoder module 112 may then transmit and store data associated with the payload of the third data packet to the first memory location. It will be appreciated that while the encoder module 106 and the decoder module 112 are illustrated in FIG. 1 as being a part of the PCIe Devices 101, 103 (i.e. GPUs) in some embodiments one or more of the encoder module 106 and/or the decoder module 112 can be separate from or external to the GPU.

Figure 2:
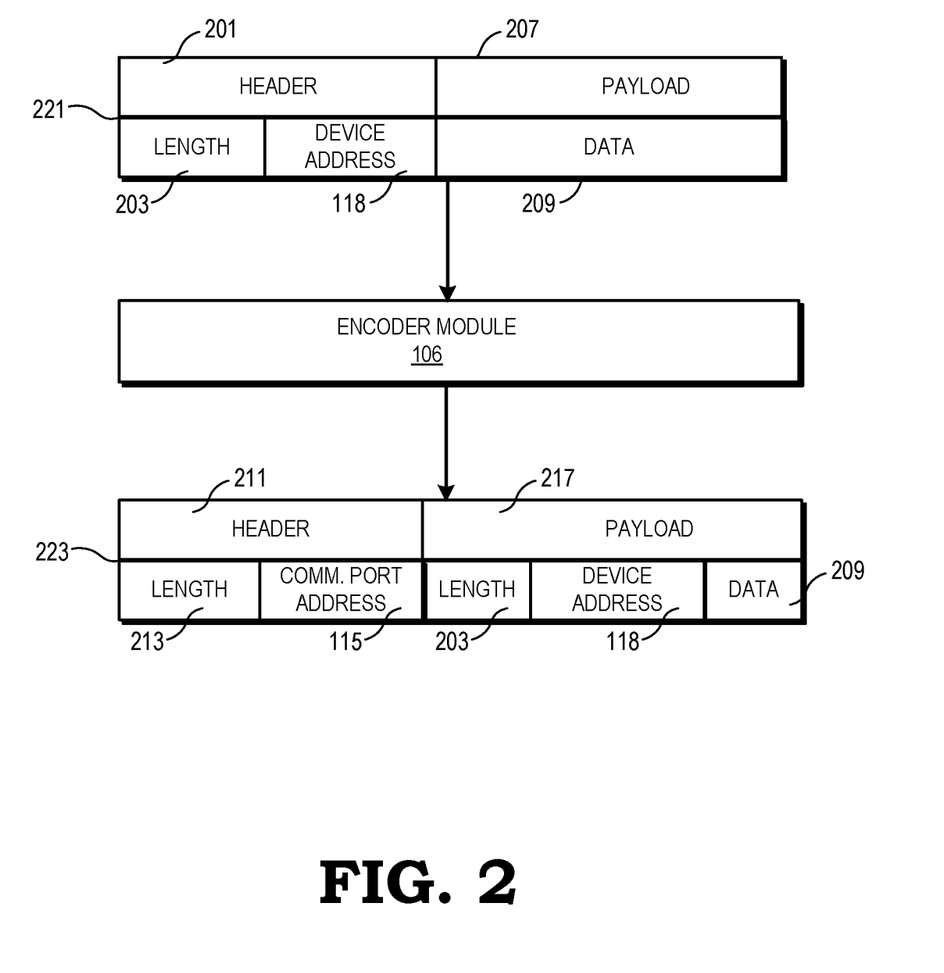
FIG. 2 depicts a block diagram of the operation of the encoder module of FIG. 1 in accordance with some embodiments.

Referring next to FIG. 2, FIG. 2 depicts a block diagram of the operation of encoder module 106 of FIG. 1 in accordance with some embodiments. The encoder module 106 (FIG. 1) is configured to obtain a data packet 221 from a PCIe Device 101 (FIG. 1). PCIe devices employ data packets to communicate information between the devices. Each transaction in a PCIe-based communication is wrapped into a data packet 221 which may include appending a header 201 to the content of the data packet 221 to provide routing before it is transmitted to another component or device. Data packets are formed in Transportation and Data Link layers to carry the information from the transmitting component or device to the receiving component or device. Typically, a data packet 221 has two parts the header 201 and the payload 207. The header 201 describes the data packet's 221 destination. Depending on the type of data packet 221, the header 201 for the data packet 221 may include some of the following types of fields: format of the data packet 221, type of the data packet 221, length 203 for any associated data, transaction descriptor (including transaction ID, attributes, and traffic class), address/routing information, and/or other fields.

The payload 207 includes the data 209 to be transmitted. The payload 207 may also be called the body or data of a packet. This is the data to be transferred between devices. Because the information in the header 201, is only used in the transmission process, it is typically stripped from the data packet 221 when it reaches its destination. Therefore, the payload 207 is the only data received by the device. However, in some embodiments of the present disclosure, in response to obtaining the data packet 221, the encoder module 106 (FIG. 1) encodes the data packet 221. To this end, the encoder module 106 (FIG. 1), is configured to embed the header 201 into the payload 207, such that the payload 207 comprises the length 203, the device address 118 (FIG. 1), and the data. The encoder module 106 (FIG. 1) then wraps the data packet 221 with a second header 211. The second header 211 may include a second length 213. The second header 211 may also include the communication port address 115 (FIG. 1) corresponding to a port 109a (FIG. 1). The data packet 221 may then be transmitted to a memory location associated with the communication port address 115 (FIG. 1).

Figure 3:
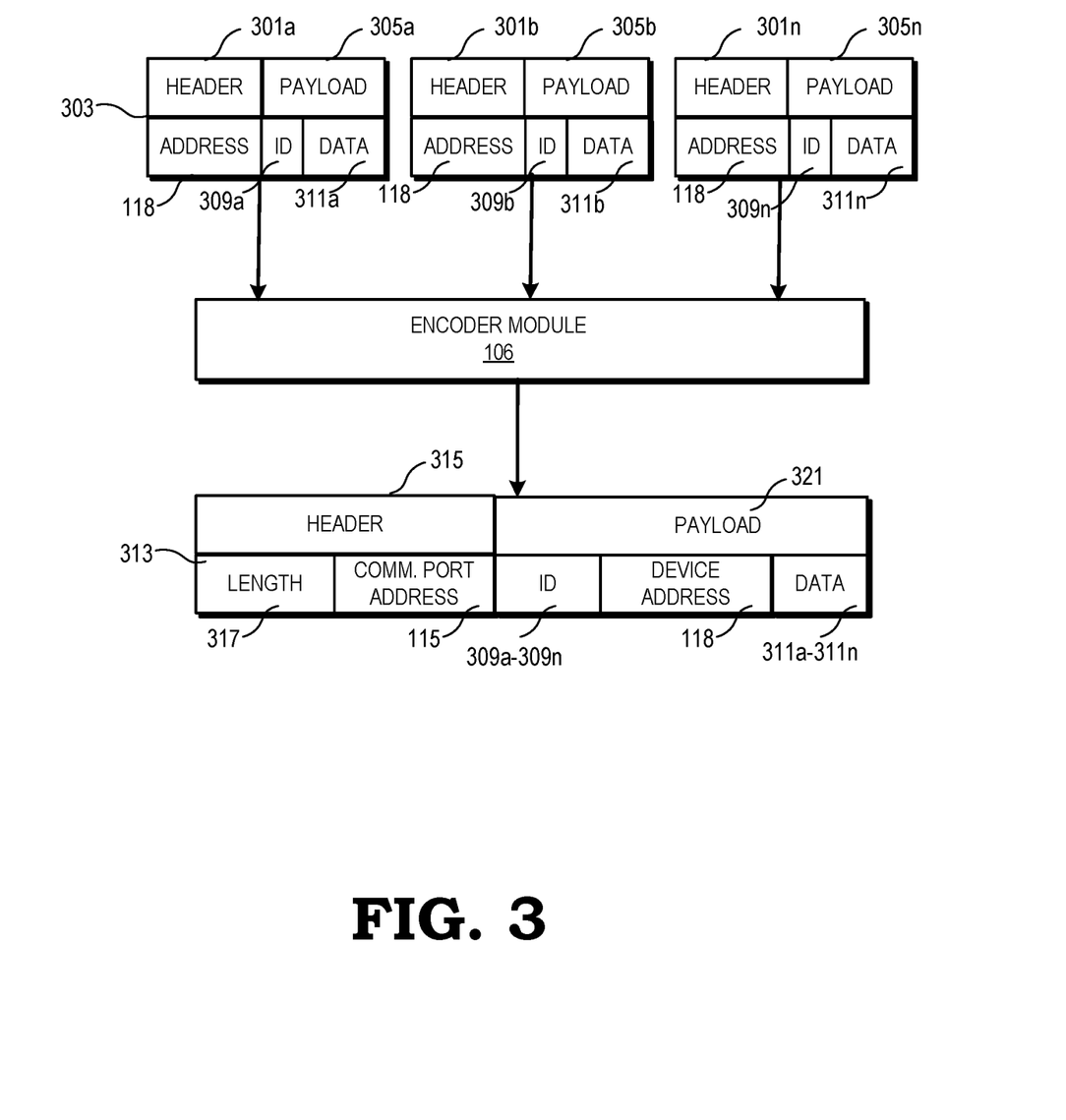
FIG. 3 depicts a block diagram representing another example of the operation of the encoder module of FIG. 1 in accordance with some embodiments.

FIG. 3 depicts a block diagram representing another example of the operation of the encoder module 106 of FIG. 1 in accordance with some embodiments. In this exemplary embodiment, the encoder module 106 (FIG. 1) is configured to obtain via a processor interconnect a plurality of data packets 301a-301n from a PCIe Device 101 (FIG. 1). Each of the data packets 301a-301n includes a first header 303a-303n. The first header 303a-303n associated with each of the data packets 301a-301n includes a first address 307 corresponding to a first memory location associated with a PCIe Device 103 (FIG. 1). Additionally, the first header 303a-303n includes a transaction identifier 309a-309n. The transaction identifier 309a-309n may be used to uniquely identify each request associated with the each of the data packets 301a-301n. For example, the transaction identifier 309a-309n may indicate a start of the transaction, a continuation of a transaction, or an end of transaction. Each of the of data packets 301a-301n also includes a payload 305a-305n. Upon identifying multiple data packets 301a-301n having the same first address 307, the encoder module 106 (FIG. 1) is configured to compress the plurality of data packets 301a-301n into a compressed data packet 313. In one embodiment, the encoder module 106 (FIG. 1) may also embed the first address 307 into the payload 321 of the compressed data packet 313. Additionally, the encoder module 106 (FIG. 1) may embed data 311a-311n associated with each of the data packets 301a-301n into the payload 321 of the compressed data packet 321. The encoder module 106 (FIG. 1) may be further configured to wrap the payload 321 with a second header 315. The second header 315 includes a second address corresponding to the communication port address 112 (FIG. 1). The encoder module 106 then transmits the compressed data packet 313 to a memory location associated with the port 109a (FIG. 1) corresponding to the communication port address 112 (FIG. 1).

Figure 4:
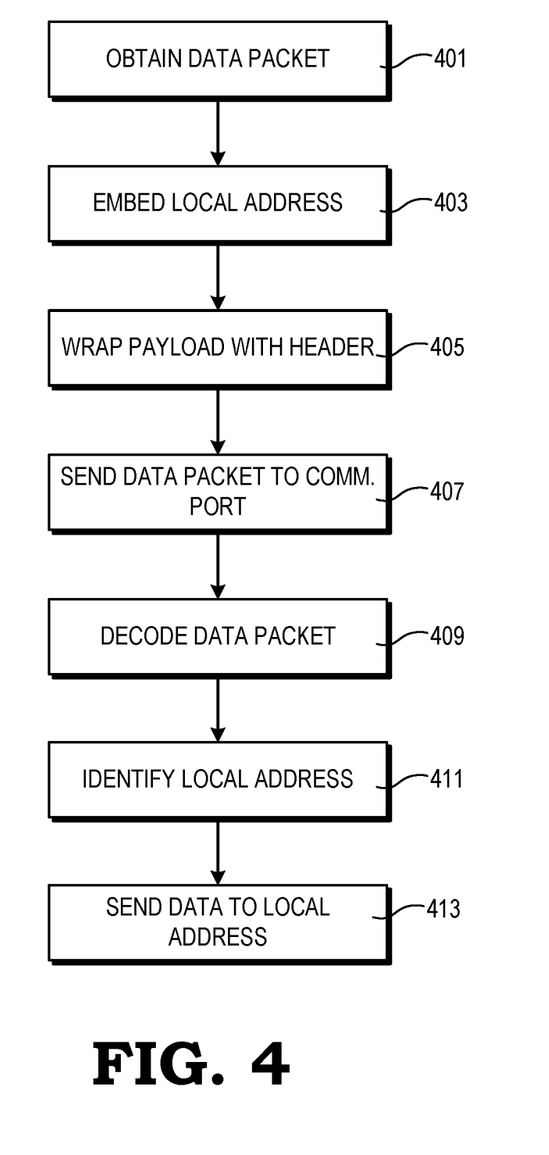
FIG. 4 is a flow diagram providing one example of the operation of a portion of the memory transfer system of FIG. 1 in accordance with some embodiments.

Referring next to FIG. 4, shown is a flowchart that provides one example of the operation of a portion of the memory transfer system 100 (FIG. 1) according to various embodiments. It is understood that the flowchart of FIG. 4 provides merely an example of the many different types of arrangements that may be employed to implement the operation of the memory transfer system 100 (FIG. 1) as described herein. As an alternative, the flowchart of FIG. 4 may be viewed as depicting an example of steps of a method implemented in a computing device according to various embodiments.

The flowchart of FIG. 4 sets forth an example of the functionality of the memory transfer system 100 (FIG. 1) in facilitating the transfer of large blocks of data between modules. While PCIe devices are discussed, it is understood that this is merely an example of the many different types of devices that may be invoked with the use of the memory transfer system 100 (FIG. 1). In addition, the flowchart of FIG. 4 provides one example of how the memory transfer system 100 (FIG. 1) processes various data packets 221 (FIG. 2), when an address space associated with a receiving memory location is larger than an address space associated with the port 109a (FIG. 1). It is understood that the flow may differ depending on specific circumstances. Also, it is understood that other flows may be employed other than those discussed herein.

Beginning with block 401, when the memory transfer system 100 (FIG. 1) is invoked to facilitate the transfer of large blocks of data between PCIe Device 101 (FIG. 1) and PCIe Device 103 (FIG. 1), a data packet 221 (FIG. 2) is obtained, by a processor interconnect. The data packet 221 includes a header 201 (FIG. 2) and a payload 207 (FIG. 2). The header 201 (FIG. 2) includes a first address corresponding to a first memory location associated with a PCIe Device 103 (FIG. 1). In response to obtaining the data packet 201, the memory transfer system 100 (FIG. 1) employs the encoder module 106 (FIG. 1) to identify the first address in the header 201 (FIG. 2). The memory transfer system 100 (FIG. 1) then moves to block 403 and employs the encoder module 106 (FIG. 1) to embed the first address in to the payload 207 (FIG. 2). During the encoding process, the first address is embedded into the payload of the data packet. Next, the memory transfer system 100 (FIG. 1) moves to block 405 and utilizes the encoder module 106 (FIG. 1) to wrap the payload 207 (FIG. 2) with a second header 211 (FIG. 2). The second header 211 (FIG. 2) includes a second address (i.e. the communication port address 112 (FIG. 1) corresponding to a second memory location associated with the port 109a (FIG. 1). The memory transfer system 100 (FIG. 1) then moves to box 407 and transmits the data packet 223 (FIG. 2) to the second memory location corresponding to the port 109a (FIG. 1). In some embodiments, the processor interconnect may be associated with a plurality of ports 109a-109n (FIG. 1), such that each of the plurality of ports is associated with different components. In response to receiving the data packet 223 (FIG. 2) at the second memory location, the memory transfer system 100 (FIG. 1) then moves to block 409 and employs the decoder module 112 (FIG. 1) to decode the data packet 223 (FIG. 2). The memory transfer system 100 then moves to block 409 and employs the decoder module 112 (FIG. 1) to identify the first address of the data packet 223. The memory transfer system 100 (FIG. 1) then moves to block 411 and stores the data 209

(FIG. 2) associated with the payload (207) to the first memory location associated with PCIe Device 103 (FIG. 1).

In some embodiments, when the memory transfer system 100 (FIG. 10) facilitates the transfer of large blocks of data 209 (FIG. 2) from PCIe Devices 101 (FIG. 1) to PCIe Device 103 (FIG. 1), the address space associated with the first address corresponding to a memory location associated with PCIe Device 103 (FIG. 1) is larger than an address space associated with the second address corresponding to the communication port address 115 (FIG. 1). To this end, the address space associated with the communication port address 115 is exposed via the PCIe base address registers. In other embodiments, at least a portion of the address space associated with the first address corresponding to PCIe Device 103 (FIG. 1) is not visible to a PCIe address space.

In some embodiments, the apparatus and techniques described above are implemented in a system including one or more integrated circuit (IC) devices (also referred to as integrated circuit packages or microchips), such as the memory transfer system 100 described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a port associated with a processor interconnect, a first data packet having a second header including a second address associated with the port;
   in response to identifying the second address from the first data packet at the port:
      identifying a first address in the first data packet, the first data packet having a first header embedded into a payload and wrapped with the second header, the first address corresponding to a first memory location; and
   storing data associated with the payload of the first data packet to the first memory location.

2. The method of claim 1, wherein an address space associated with the second address is smaller than an address space associated with the first address.

3. The method of claim 1, wherein the processor interconnect is associated with a plurality of ports, wherein each of the plurality of ports is associated with a different device.

4. The method of claim 1, wherein the first address is encoded into the payload of the first data packet.

5. The method of claim 1, further comprising:
   receiving at the port a second data packet having a second header including the first address;

in response to identifying the first address from the second data packet at the port:
    decoding the first data packet;
    identifying, a third address in a payload of the second data packet, the third address corresponding to a second memory location different from the first memory location; and
    storing data associated with the payload of the second data packet to the first memory location.

6. The method of claim 5, wherein the first data packet and the second data packet are associated with a transfer of a block of data from one memory location to another memory location.

7. A method comprising:
    obtaining, by a processor interconnect, a first data packet, the first data packet having a payload, the first data packet having a first header including a first address corresponding to a first memory location associated with a PCIe device;
    in response to obtaining the first data packet, encoding a second data packet, wherein encoding the second data packet comprises:
        wrapping the payload associated with the first data packet with a second header, the second header having a second address corresponding to a second memory location associated with a port; and
        embedding the first address into the payload of the first data packet;
    transmitting the second data packet having the first header and the second header to the second memory location;
    in response to receiving the second data packet at the second memory location, decoding the second data packet; and
    identifying the first address of the first data packet; and
    storing data associated with the payload to the first memory location.

8. The method of claim 7, wherein an address space associated with the first address is larger than an address space associated with the second address.

9. The method of claim 8, wherein at least a portion of the address space associated with the first address is not visible to a PCIe address space.

10. The method of claim 9, wherein the address space associated with the second address is visible to the PCIe address space.

11. The method of claim 7, wherein the processor interconnect is associated with a plurality of ports, wherein each of the plurality of ports is associated with a different component.

12. The method of claim 7, further comprising:
    receiving at the port a third data packet having a third header including the first address;
    in response to identifying the first address from the third data packet at the port:
        decoding the third data packet;
        identifying, a third address in a payload of the third data packet, the third address corresponding to a third memory location different from the first and second memory locations; and
        storing data associated with the payload of the third data packet to the first memory location.

13. The method of claim 12, wherein the first data packet, the second data packet and the third data packet are associated with a transfer of a block of data from one memory location to another memory location.

14. The method of claim 12, wherein an address space associated with the first address is larger than an address space associated with the third address.

15. A memory transfer device comprising:
    an encoder module configured to:
        obtain, by a processor interconnect, a plurality of data packets, each of the plurality of data packets having a first header, the first header associated with each of the plurality of data packets having a first address corresponding to a first memory location, each of the plurality of data packets having a payload, the first header associated with each of the plurality of data packets having a transaction identifier;
        compress the plurality of data packets into a compressed data packet;
        embed the first address into a payload of the compressed data packet;
        embed data associated with each of the data packets into the payload of the compressed data packet; and
        wrap the payload with a second header, the second header including a second address;
    a port, the port having a second memory location corresponding to the second address, the port being configured to receive the compressed data packet, the compressed data packet the first header and the second header; and
    a decoder module being configured to:
        determine that the compressed data packet has been received by the port;
        decode the compressed data packet in response to a determination that the compressed data packet has been received by the port, wherein decoding further comprises identifying the first address, wherein decoding further comprises identifying each of the payloads; and
        perform a transaction, based at least in part upon the transaction identifier, wherein the transaction involves each of the payloads; and
        storing an output of the transaction to the first memory location.

16. The memory transfer device of claim 15, wherein an address space associated with the second address is smaller than an address space associated with the first address.

17. The memory transfer device of claim 15, wherein the processor interconnect is associated with a plurality of ports, wherein each of the plurality of ports is associated with a different device.

18. The memory transfer device of claim 15, wherein the transaction identifier indicates a start of the transaction.

19. The memory transfer device of claim 15, wherein the transaction identifier indicates a continuation of the transaction.

20. The memory transfer device of claim 15, wherein the transaction identifier indicates an end of the transaction.

* * * * *